US012695308B2

(12) United States Patent
Witteman et al.

(10) Patent No.: US 12,695,308 B2
(45) Date of Patent: Jul. 28, 2026

(54) REDUCING RISK OF REVERSE BIAS IN PARTIALLY-SHADED SOLAR MODULES

(71) Applicant: TAYLOR TECHNOLOGIES HOLDING B.V., Eindhoven (NL)

(72) Inventors: Joris Witteman, Eindhoven (NL); Michiel Roelofs, Eindhoven (NL); Siva Sembian, Eindhoven (NL)

(73) Assignee: TAYLOR TECHNOLOGIES HOLDING B.V., Eindhoven (NL)

( * ) Notice: Subject to any disclaimer, the term of this patent is extended or adjusted under 35 U.S.C. 154(b) by 0 days.

(21) Appl. No.: 18/687,172

(22) PCT Filed: Aug. 26, 2022

(86) PCT No.: PCT/NL2022/050489
§ 371 (c)(1),
(2) Date: Feb. 27, 2024

(87) PCT Pub. No.: WO2023/027588
PCT Pub. Date: Mar. 2, 2023

(65) Prior Publication Data
US 2024/0388099 A1      Nov. 21, 2024

(30) Foreign Application Priority Data

Aug. 27, 2021    (NL) ...................................... 2029069

(51) Int. Cl.
*H02J 3/38* (2026.01)
*H02J 101/24* (2026.01)
*H02S 50/10* (2014.01)

(52) U.S. Cl.
CPC ................ *H02J 3/38* (2013.01); *H02S 50/10* (2014.12); *H02J 2101/25* (2026.01)

(58) Field of Classification Search
CPC ......... H02J 3/38; H02J 2300/26; H02S 50/10; G05F 1/67
See application file for complete search history.

(56) References Cited

U.S. PATENT DOCUMENTS

| | | | | |
|---|---|---|---|---|
| 2012/0181973 A1* | 7/2012 | Lyden | ..................... | H02S 20/00 |
| | | | | 320/101 |
| 2014/0077608 A1* | 3/2014 | Nosaka | ................... | H02J 1/102 |
| | | | | 307/77 |

OTHER PUBLICATIONS

Abhishek Kumar Gupta, et al. "Review on widely-used MPPT Techniques for PV Applications", 2016 1st International Conference on Innovation and Challenges in Cyper Security (ICICCS 2016).
PCT International Search Reporgt dated Nov. 30, 2022; PCT/NL2022/050489.

(Continued)

*Primary Examiner* — Rexford N Barnie
*Assistant Examiner* — Thai H Tran
(74) *Attorney, Agent, or Firm* — Suiter Swantz IP

(57) ABSTRACT

A controller for a solar power generation system comprising a plurality of photovoltaic cells, the controller comprising: a meter instrument configured for determining an electrical parameter representative of an open circuit voltage of at least one photovoltaic cell of the plurality of photovoltaic cells; and at least one control unit configured for: calculating a limit voltage based on the open circuit voltage; and performing maximum power point tracking of the plurality of photovoltaic cells, between the limit voltage and the open circuit voltage.

18 Claims, 6 Drawing Sheets

(56) References Cited

OTHER PUBLICATIONS

R. Balasankar et al. "A global MPPT technique invoking partitioned estimation and strategic deployment of P&O to tackle partial shading conditions" Solar Energy 143 (2017) 73-85.
Trishan Esram, et al. "Comparison of Photovoltaic Array Maximum Power Point Tracking Techniques", IEEE Transactions On Energy Conversion, vol. 22, No. 2, Jun. 2007.

* cited by examiner

REDUCING RISK OF REVERSE BIAS IN PARTIALLY-SHADED SOLAR MODULES

TECHNICAL FIELD

The present disclosure relates generally to controlling solar power generation systems comprising a plurality of photovoltaic cells. Such systems are also named solar modules. In particular, the present disclosure relates to a controller for a solar power generation system, to a solar power generation system comprising such a controller, to a method of controlling a solar power generation system, and to a related computer program and a computer program product.

BACKGROUND

Partial shading represents a significant problem for the use of solar power generation systems using photovoltaic cells, which are normally arranged in series. This is because the unshaded cells push the shaded cells into reverse bias and the shaded cells start to generate heat, leading to so-called "hotspots", especially if the number of shaded cells is much smaller than the number of unshaded cells. In general, reverse bias conditions of solar cells are detrimental to their longevity.

Most conventional approaches for solar power generation systems are protected against too high reverse bias by including one or more bypass diodes (typically three per solar modules). This is not sufficient to prevent long term damage to the performance of the solar module.

The impact of reverse bias is known to differ between different types of photovoltaic cells. Typically, for crystalline silicon-based cells this leads to excessive heating, and therefore, bypass diodes are included in anti-parallel with groups of 20-24 solar cells arranged in series.

In thin-film type solar cells such as CIGS, Perovskite and Cadmium telluride, reverse bias may lead to critically decreased reliability and/or performance. For these thin-film type solar cells, bypass diodes are also used, 1 diode per solar module or 1 diode per 2 cells.

Most conventional approaches for solar power generation systems perform maximum power point tracking (MPPT) per one or more solar modules combined in series. For example, using perturb and observe (P&O).

Other conventional approaches for solar power generation systems comprise cell string optimisers, which typically perform maximum power point tracking (MPPT) per 10-30 photovoltaic cells. For example, maximum power point tracking (MPPT) using perturb and observe (P&O).

These approaches are deemed ineffective, inter alia because other operating voltages may be missed whereas the maximum power point of the group of cells may still lead to reverse bias conditions in at least one individual cell, in particular in case of partial shading.

SUMMARY

It is an aim of embodiments according to the present disclosure to solve at least some of the above-described problems.

According to a first aspect of the present disclosure, there is provided a controller for a solar power generation system comprising a plurality of photovoltaic cells, the controller comprising:

a meter instrument configured for determining an electrical parameter representative of an open circuit voltage of at least one photovoltaic cell of the plurality of photovoltaic cells; and at least one control unit configured for:

calculating a limit voltage based on the open circuit voltage; and performing maximum power point tracking of the plurality of photovoltaic cells, between the limit voltage and the open circuit voltage.

The present solution is based on the idea of tracking the maximum power point, MPP, but within smarter boundaries, namely respecting the lower limit voltage. This reduces the risk of forcing one or more photovoltaic cells into reverse bias. In practical terms, either the controller selects the absolute MPP, or it respects a safe limit and sets the operating voltage at that highest safely-available power point. Incidentally, this represents a trade-off between maximum power and minimum damage due to reverse bias (when in low-voltage).

It is noted that the expression "setting the operating voltage" is not to be construed in a limiting manner, and that this may in practical implementations also be done by setting a duty ratio, for example.

Advantageously, the meter instrument can also be used for measuring a voltage and a current to be used in the MPPT. In particular, the input and output voltage of the controller and/or the input and output current can be measured for this purpose.

In an embodiment, the at least one control unit is configured for performing the MPPT based on a perturb and observe, P&O, method. However, other MPPT methods, such as incremental conductance, may also be used.

In an embodiment, the limit voltage is calculated to be in a range of 80% to 110%, preferably 90% to 100% of a ratio of a predetermined maximum power point voltage to the open circuit voltage.

In an embodiment, the limit voltage is calculated in a range of 0.700-0.850 of the open circuit voltage.

In an embodiment, the limit voltage is calculated as circa 0.750-0.800, preferably circa 0.795 of the open circuit voltage.

The inventors have found that choosing the limit voltage in the above ranges is a good way of exploiting the typical ratio of the open circuit voltage and the maximum power point voltage under different operating conditions. A typical fill factor of the different types of solar cells helps in determining an optimal ratio of the open circuit voltage. Calculating the ratio using above methods prevents the control unit in making computationally complicated trade-offs.

Note that a reverse-bias characteristic defines a threshold for the number of cells, below which a complete control of reverse bias is theoretically possible, and above which the risk of reverse bias can only be reduced, to an extent reversely proportional to the number of cells.

It is preferred to use the controller with photovoltaic cells having crystalline silicon material or tandem structures. In this case, the limit voltage may preferably be calculated circa 0.85 for crystalline silicon cells, and circa 0.78 for tandem cells.

The inventors have found that for perovskite-based photovoltaic cells, the ratio of the maximum power point voltage to the open circuit voltage is on average in the range 0.81-0.85, and for c-Si cells, the ratio of the maximum power point voltage to the open circuit voltage is on average 0.76-0.8.

By preferably choosing the limit voltage just below this value, possible deterioration due to conditions such as age, temperature, irradiation, etc. can be taken into account.

Note that the term "circa" is defined as "within 10%, preferably within 5% of".

In an embodiment, the MPPT is iterated over a plurality of iterations.

In a preferred embodiment, the photovoltaic cells comprise tandem photovoltaic cells.

In an embodiment, the photovoltaic cells comprise crystalline silicon, copper indium gallium diselenide (CIGS), Perovskite or Cadmium telluride cells.

In an embodiment, the controller is implemented digitally.

According to a second aspect of the present disclosure, there is provided a solar power generation system comprising a plurality of photovoltaic cells, the system comprising the controller of any above-described embodiment.

The skilled person will understand that the considerations and advantages of the above-described controller also apply to the solar power generation system analogously, mutatis mutandis.

According to a third aspect of the present disclosure, there is provided a method of controlling a solar power generation system comprising a plurality of photovoltaic cells, the method comprising:

determining an electrical parameter representative of an open circuit voltage of at least one photovoltaic cell of the plurality of photovoltaic cells;

calculating a limit voltage based on the open circuit voltage;

performing maximum power point tracking, MPPT, of the plurality of photovoltaic cells, between the limit voltage and the open circuit voltage.

The skilled person will understand that the considerations and advantages of the above-described controller also apply to the method analogously, mutatis mutandis.

In an embodiment, performing the MPPT comprises a perturb and observe, P&O, method.

In an embodiment, the limit voltage is calculated to be in a range of 80% to 110%, preferably 90% to 100% of a ratio of a predetermined maximum power point voltage to the open circuit voltage.

In an embodiment, the limit voltage is calculated in a range of 0.700-0.850 of the open circuit voltage.

In an embodiment, the limit voltage is calculated as circa 0.750-0.800, preferably circa 0.795 of the open circuit voltage.

Note that "circa" is defined as "within 10%, preferably within 5%" of.

In an embodiment, the MPPT is iterated over a plurality of iterations.

In an embodiment, the photovoltaic cells comprise tandem cells.

In an embodiment, the photovoltaic cells comprise crystalline silicon, copper indium gallium diselenide (CIGS), Perovskite or Cadmium telluride cells.

According to a fourth aspect of the present disclosure, there is provided a computer program comprising instructions configured for, when executed by at least one processor, causing the at least one processor to perform the method of any one of the above-described embodiments.

According to a fifth aspect of the present disclosure, there is provided a computer program product comprising a computer-readable medium storing the computer program of the above-described embodiment.

The skilled person will understand that the considerations and advantages of the above-described controller also apply to the computer program and computer program product analogously, mutatis mutandis.

Embodiments described in the present disclosure are not construed to limit the scope of the present disclosure and the scope of embodiments according to the present disclosure is determined by the claims.

BRIEF DESCRIPTION OF THE DRAWINGS

The present disclosure will be more fully understood with the help of the appended drawings, and their corresponding description below, in which.

DETAILED DESCRIPTION

Figure 1:
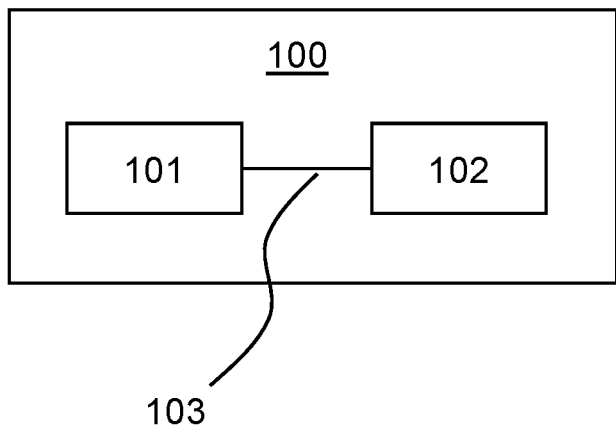
FIG. 1 schematically represents an embodiment of a controller according to the present disclosure.

FIG. 1 schematically represents an embodiment of a controller 100 according to the present disclosure. The controller 100 comprises a meter instrument 101 configured for determining an electrical parameter representative of an open circuit voltage of at least one photovoltaic cell of the plurality of photovoltaic cells. The controller 100 further comprises at least one control unit 102 configured for calculating a limit voltage based on the open circuit voltage and performing maximum power point tracking of the plurality of photovoltaic cells, between the limit voltage and the open circuit voltage. A data link 103 may be provided to communicate the open circuit voltage, or at least the electrical parameter representative of the open circuit voltage, from the meter instrument 101 to the at least one control unit 102. In this example, only one control unit 102 is shown, but it will be understood that there may be several control units in other embodiments. It will also be understood that the control unit may be implemented as a microcontroller, or as a purpose-built electronic device, or in any other suitable way.

Figure 2:
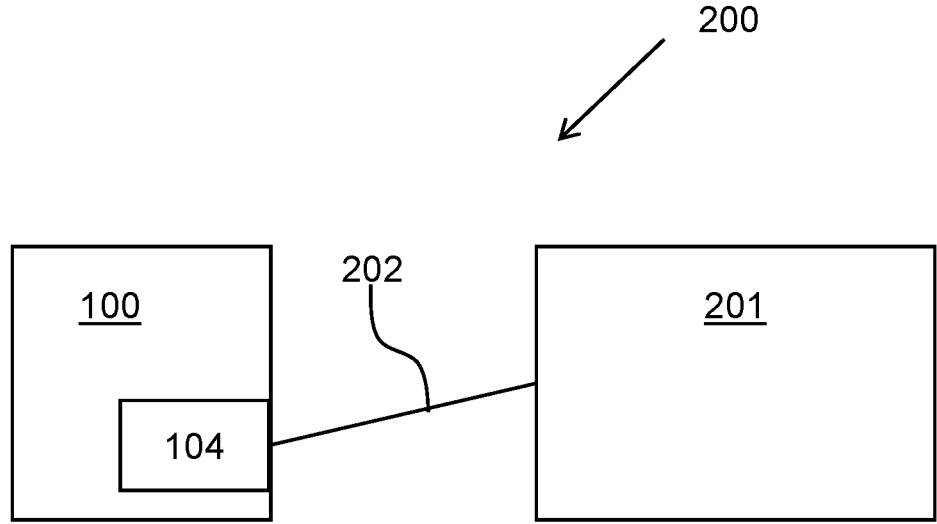
FIG. 2 schematically represents an embodiment of a solar power generation system according to the present disclosure, for example comprising the controller embodiment of FIG. 1.

FIG. 2 schematically represents an embodiment of a solar power generation system 201 according to the present disclosure, for example comprising the controller 100 embodiment of FIG. 1. Furthermore, a control link 202 may be provided, via which the controller 100 may control the solar power generation system 201. To this end, controller 104 may be provided with an interface 104 configured for interfacing between the controller 100 and the solar power generation system 201. The solar power generation system 201 may be any type of solar power generation system, using photovoltaic cells. The combination of the solar power generation system 201 and controller 100 may still be called a solar power generation system 200, with the implicit understanding that it comprises the controller 100.

Figure 3:
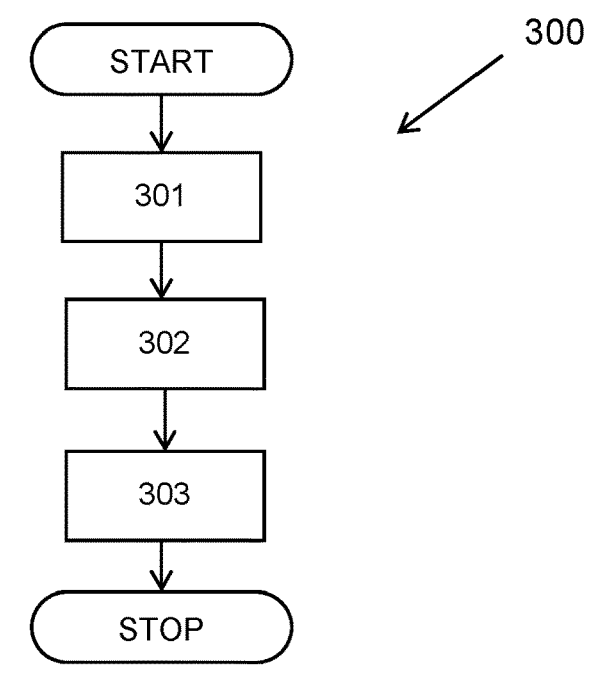
FIG. 3 schematically represents an embodiment of a method according to the present disclosure, for example performed by the controller embodiment of FIG. 1.

FIG. 3 schematically represents an embodiment of a method 300 according to the present disclosure, for example performed by the controller embodiment 100 of FIG. 1. The method 300 serves for controlling a solar power generation system, for example the solar power generation system embodiment 200 of FIG. 2, which system comprises a plurality of photovoltaic cells. The method 300 comprises: determining 301 an electrical parameter representative of an open circuit voltage of at least one photovoltaic cell of the plurality of photovoltaic cells; calculating 302 a limit voltage based on the open circuit voltage; performing 303 maximum power point tracking, MPPT, of the plurality of photovoltaic cells, between the limit voltage and the open circuit voltage.

In preferred embodiments, the time period at which the open circuit voltage and/or limit voltage are re-determined, is in a range between 30 seconds to 10 minutes. It is possible to use a much smaller time period, e.g. in a range of 1-1000 milliseconds, but this is less preferred because re-determining said voltage precludes generating useful power, and because the temperature of the plurality of photovoltaic cells is unlikely to change significantly during such a small time period.

The skilled person will understand how to perform MPPT per se, within the limits defined in the present disclosure, namely the limit voltage and the open circuit voltage. A difference of embodiments according to the present disclosure with conventional approaches of MPPT is that those conventional approaches do not set a lower limit to the MPPT but opt to maximise power absolutely. Therefore, the conventional approaches run an increased risk of forcing one or more photovoltaic cells into reverse bias.

Figure 4:
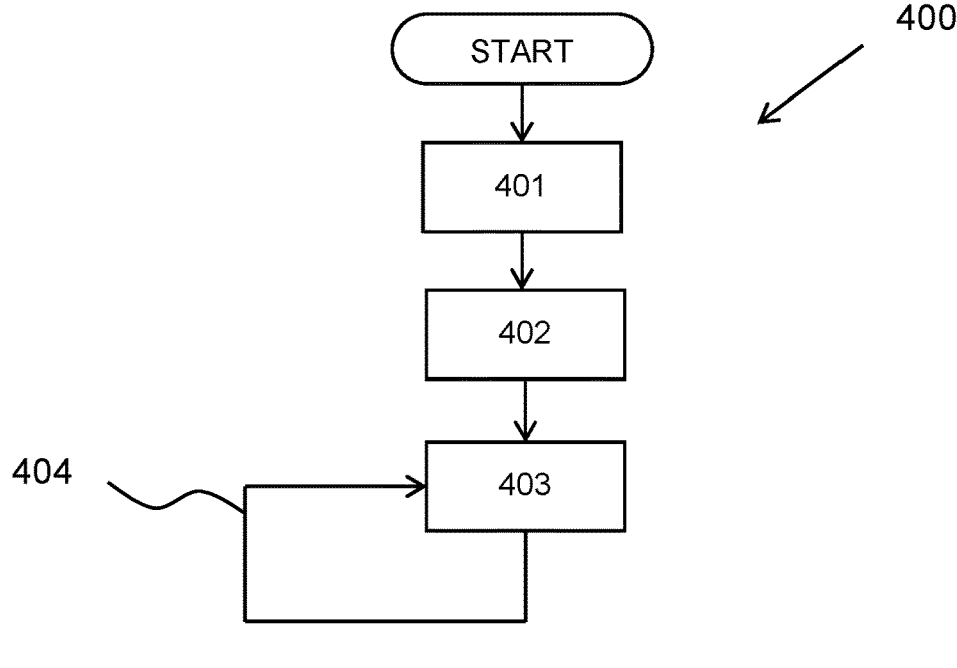
FIG. 4 schematically represents another embodiment of a method according to the present disclosure, for example performed by the controller embodiment of FIG. 1.

FIG. 4 schematically represents another embodiment of a method 400 according to the present disclosure, for example performed by the controller embodiment 100 of FIG. 1. The method embodiment 400 of FIG. 4 is analogous to the method embodiment 300 of FIG. 3 and therefore has analogous reference number 401-403 for the reference numbers 301-303 of FIG. 3. The method embodiment 400 of FIG. 4 differs from the method embodiment 300 of FIG. 3 only in that the step 403, i.e. the MPPT, is iterated 404 over a plurality of iterations. The number of iterations need not be determined beforehand, if the step 403 of performing the MPPT is performed continuously.

Figure 5:
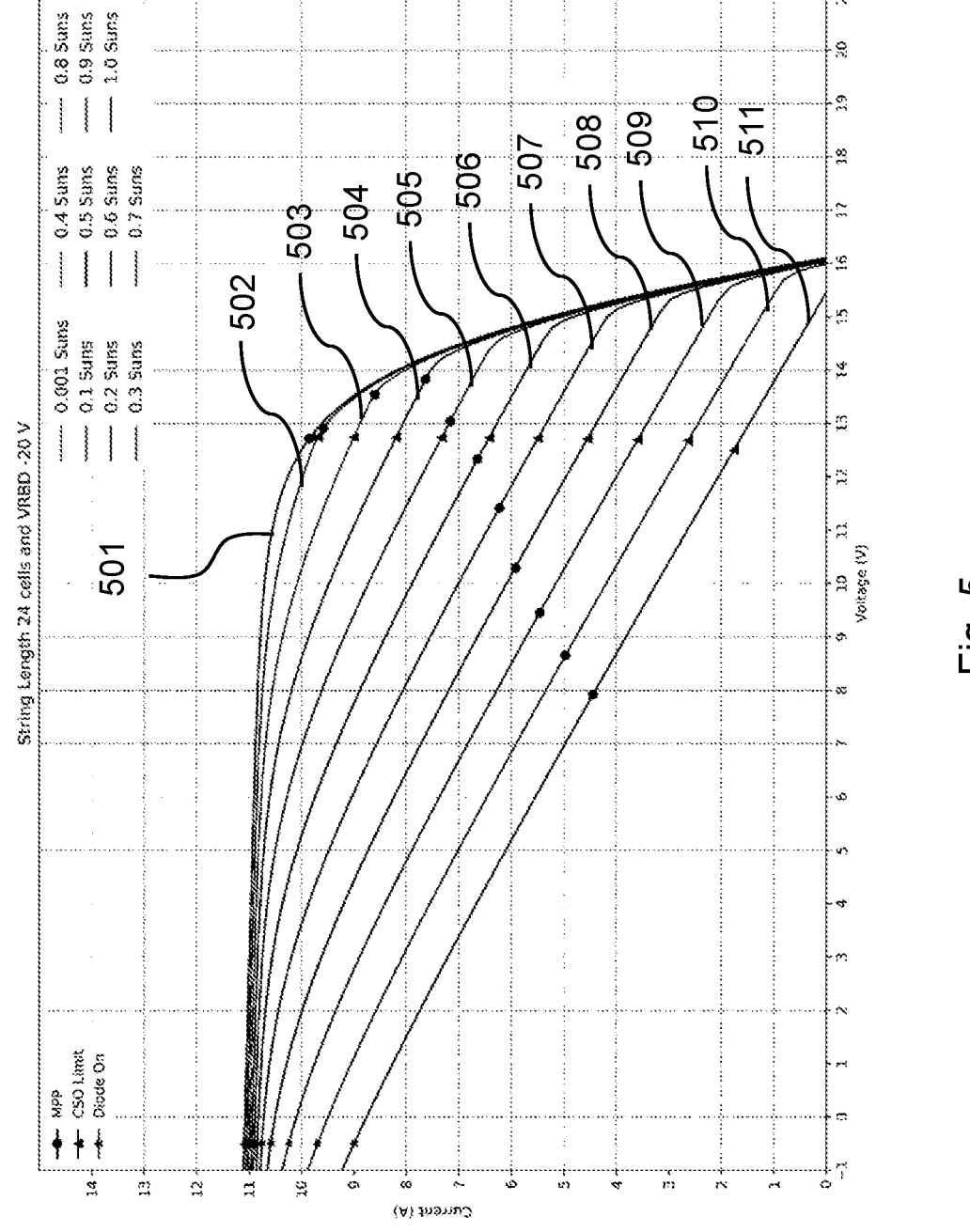
FIG. 5 shows a graph of a number of current-voltage, i.e. IV, curves of a solar cell under varying degrees of (partial) shading, on which several relevant points are indicated.
Figure 6:
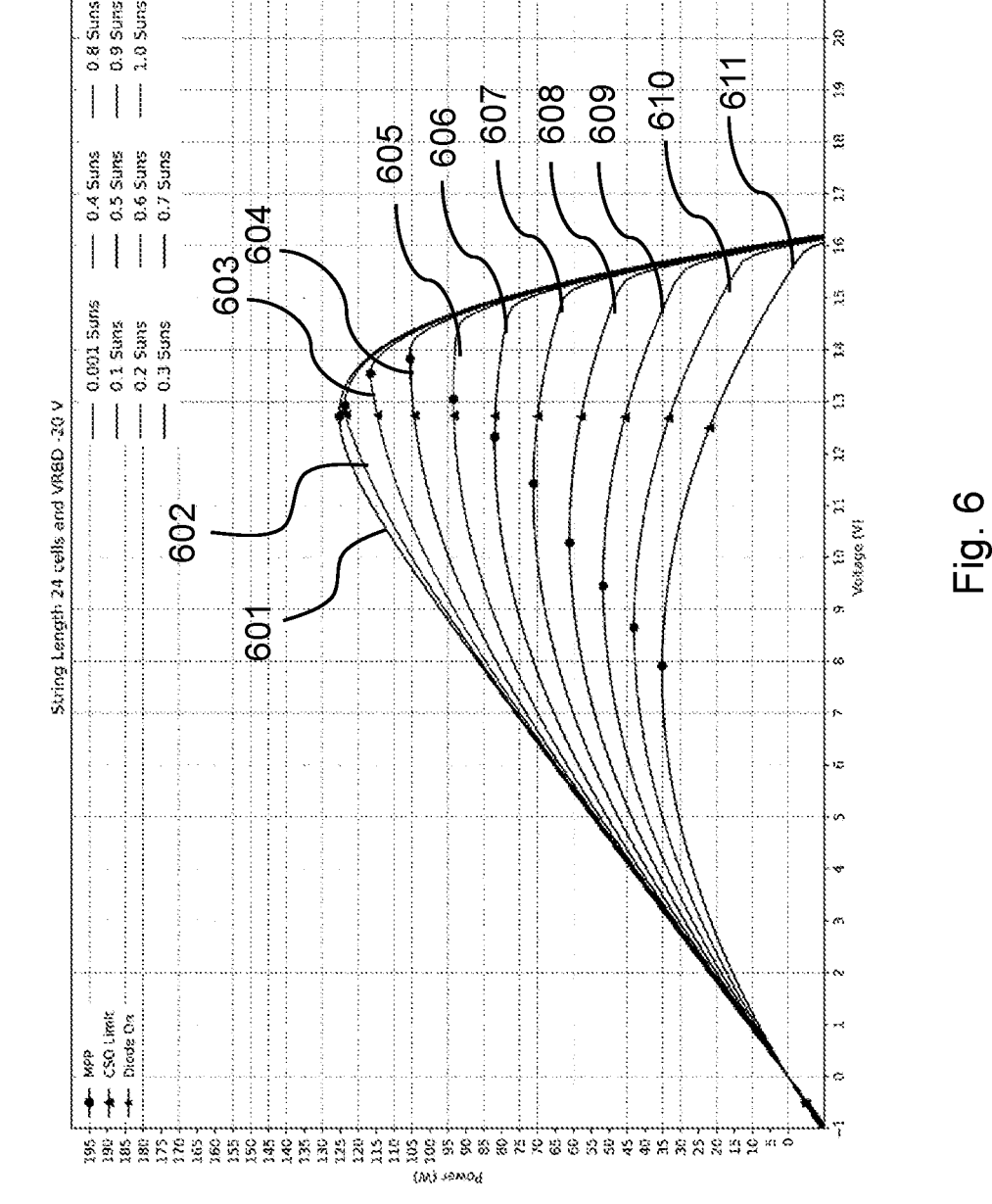
FIG. 6 shows a graph of a number of power-voltage, i.e. PV, curves of a solar cell under varying degrees of (partial) shading, on which several relevant points are indicated, corresponding with FIG. 5.
Figure 7:
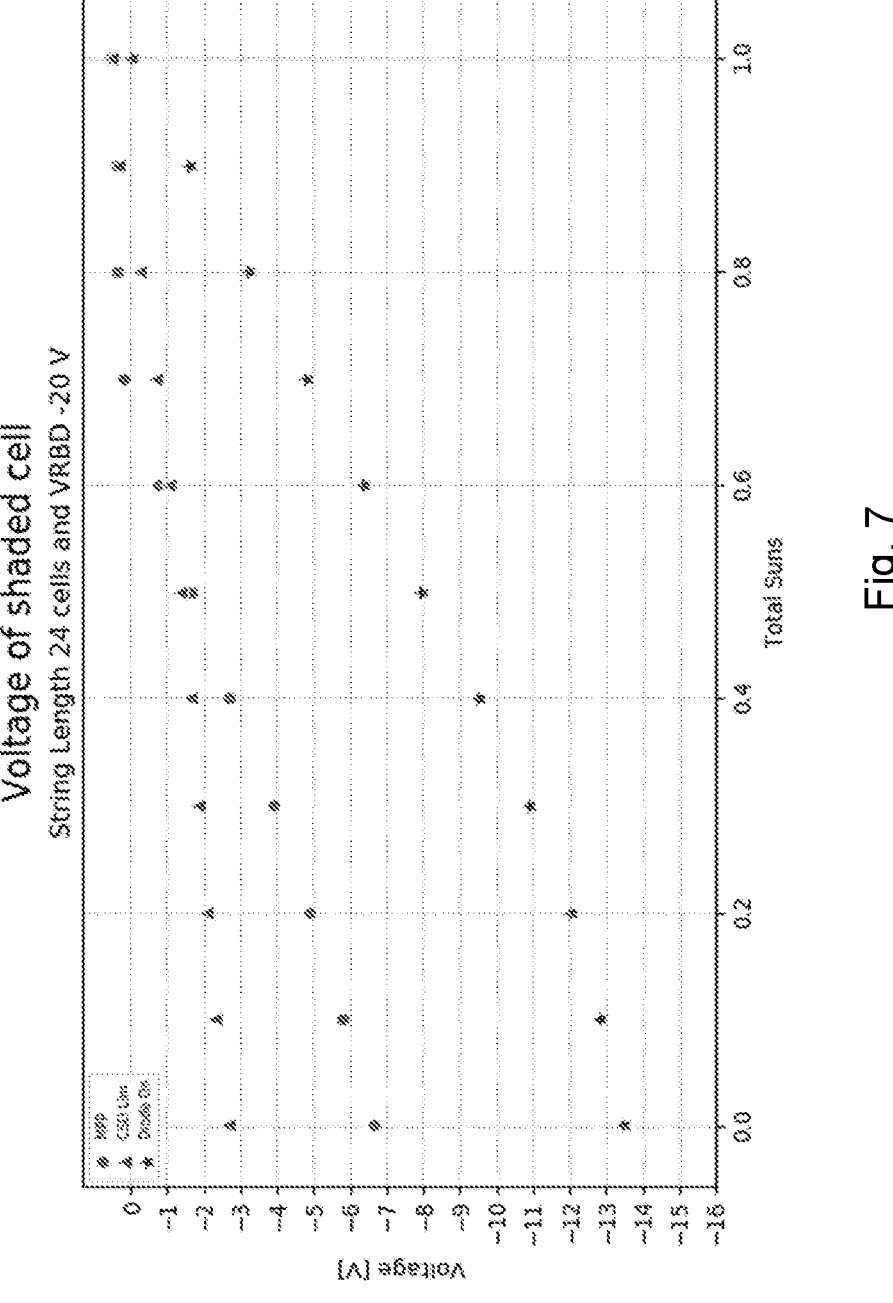
FIG. 7 shows a graph of a voltage of a solar cell under varying degrees of (partial) shading.
Figure 8:
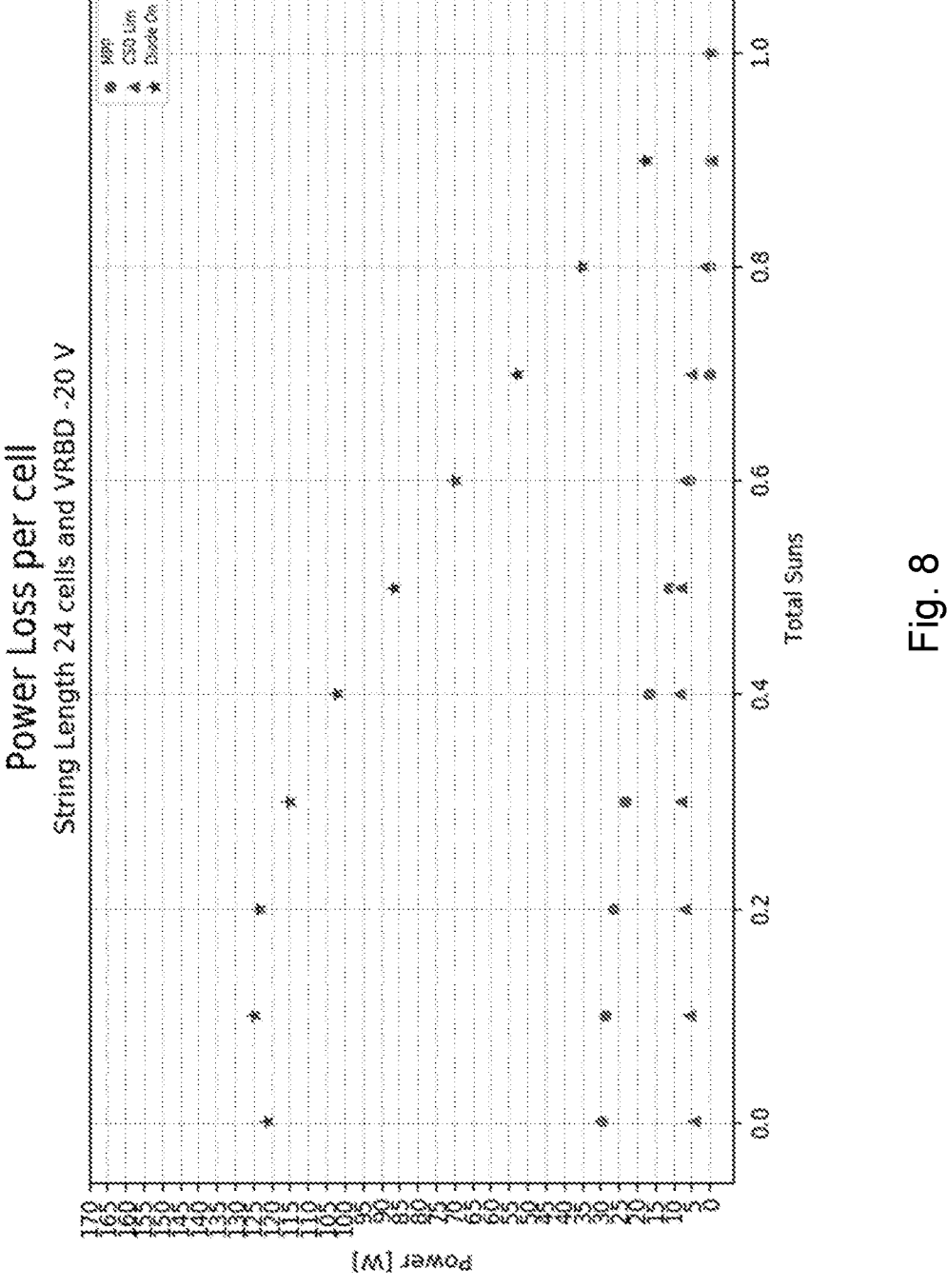
FIG. 8 shows a graph of a power loss of a solar cell under varying degrees of (partial) shading.

FIG. 5 shows a graph of a number of current-voltage, i.e. IV, curves of a solar cell under varying degrees of (partial) shading, on which several relevant points are indicated. The graph shows 11 IV curves, 501-511, with the following partial shading values: 501 is 1.0 suns, i.e. 0% shaded; 502 is 0.9 suns; 503 is 0.8 suns; 504 is 0.7 suns; 505 is 0.6 suns; 506 is 0.5 suns; 507 is 0.4 suns; 508 is 0.3 suns; 509 is 0.2 suns; 510 is 0.1 suns; and 511 is 0.001 suns, i.e. 99.9% shaded. In other words, the individual IV curves represent increasing degrees of partial shading from top to bottom.

On each IV curve, the maximum power point, MPP, is indicated with a circle. It can be seen that for increasing degrees of partial shading, the MPP shifts to lower voltage values. On each IV curve, the operating point when the bypass diode is in conduction (instead of a controller), is indicated with a star. The operating point is determined by the negative voltage drop of the diode.

If the controller 100 were to naively set the operating voltage of the solar power generation system 200 to this MPP voltage, there would be a relatively higher risk of operating at least one of the photovoltaic cells in reverse bias for the situations with relatively higher degree of partial shading.

Therefore, it is an insight of the inventors to have the controller 100 maintain the operation voltage of the solar power generation system 200 at an optimal level above a minimum threshold. To this end, the controller 100 comprises a meter instrument 101 configured for determining an electrical parameter representative of an open circuit voltage, which is represented in the graph as the intersection of each IV curve with the 0 A current line.

The controller 100 further also comprises at least one control unit 102, which is configured for: calculating a limit voltage, indicated in the graph with a triangle on each IV-curve and referred to in the graph legend as cell string optimizer, CSO, limit, based on the open circuit voltage. In a practical embodiment, the limit voltage may be determined as the ratio of the maximum power point voltage to the open circuit voltage, preferably taking into account a small margin to cover for possible deteriorations.

The at least one control unit 102 may be further configured for performing maximum power point tracking, MPPT, of the plurality of photovoltaic cells, between the limit voltage and the open circuit voltage. In other words, the at least one control unit 102 may track the maximum power point, MPP, indicated in the graph with a circle, as long as the MPP is situated at a voltage value between the limit voltage, indicated in the graph with triangle, and the open circuit voltage, i.e. the intersection of the IV curves with the 0 A current line.

The advantage of this configuration is that the controller 100 is able to profit from the exact maximum power point for situations with none or limited partial shading, in this case IV curves 501-505, although in other examples these values may differ, whereas the controller 100 still keeps the operating voltage safe for situations with more severe partial shading, by selecting a maximum power point only between the limit voltage and the open circuit voltage, in other words to the right of the limit voltage in the graph,

The invention claimed is:

1. A controller for a solar power generation system, the controller comprising:

a meter instrument configured for determining an electrical parameter representative of an open circuit voltage of at least one photovoltaic cell of a plurality of photovoltaic cells, wherein the electrical parameter representative is based on voltage values and current values measured under a set of operating conditions using the meter instrument, wherein the electrical parameter representative includes at least one of an IV curve or a PV curve based on the voltage values and the current values measured under the set of operating conditions using the meter instrument; and at least one control unit configured for:

calculating a limit voltage by multiplying the open circuit voltage by a predetermined ratio of a maximum power point (MPP) voltage to the open circuit voltage, wherein the open circuit voltage is a maximum voltage value of the voltage values measured when a current value of the current values measured is zero, wherein the MPP voltage is a point on at least one of the IV curve or the PV curve where the voltage values and the current values measured are maximized; and determining an operating voltage of the plurality of photovoltaic cells by performing maximum power point tracking (MPPT) of the plurality of photovoltaic cells, between the limit voltage and the open circuit voltage,

wherein the at least one control unit is configured to select the MPP voltage as the operating voltage of the plurality of photovoltaic cells when the MPP voltage is greater than or equal to the limit voltage, wherein the at least one control unit is configured to select the limit voltage as the operating voltage of the plurality of photovoltaic cells when the MPP voltage is less than the limit voltage.

2. The controller of claim 1, wherein the at least one control unit is configured for performing the MPPT based on a perturb and observe, P&O, method.

3. The controller of claim 1, wherein the limit voltage is calculated to be in a range of 80% to 110% of the ratio of the predetermined MPP voltage to the open circuit voltage.

4. The controller of claim 1, wherein the predetermined ratio of the MPP voltage to the open circuit voltage is in a range of 0.700-0.850.

5. The controller of claim 4, wherein the limit voltage is calculated as circa 0.750-0.800 of the open circuit voltage.

6. The controller of claim 1, wherein the MPPT is iterated over a plurality of iterations.

7. The controller of claim 1, wherein the photovoltaic cells comprise tandem cells.

8. The controller of claim 1, wherein the photovoltaic cells comprise the photovoltaic cells comprise, crystalline silicon (CIGS), Perovskite or Cadmium telluride cells.

9. The controller of claim 1, wherein the controller is implemented digitally.

10. A solar power generation system comprising:

a plurality of photovoltaic cells; and a controller, wherein the controller comprises:

a meter instrument configured for determining an electrical parameter representative of an open circuit voltage of at least one photovoltaic cell of the plurality of photovoltaic cells, wherein the electrical parameter representative is based on voltage values and current values measured under a set of operating conditions using the meter instrument, wherein the electrical parameter representative includes at least one of an IV curve or a PV curve based on the voltage values and the current values measured under the set of operating conditions using the meter instrument; and at least one control unit configured for:

calculating a limit voltage by multiplying the open circuit voltage by a predetermined ratio of a maximum power point (MPP) voltage to the open circuit voltage, wherein the open circuit voltage is a maximum voltage value of the voltage values measured when a current value of the current values measured is zero, wherein the MPP voltage is a point on at least one of the IV curve or the PV curve where the voltage values and the current values measured are maximized; and determining an operating voltage of the plurality of photovoltaic cells by performing maximum power point tracking (MPPT) of the plurality of photovoltaic cells, between the limit voltage and the open circuit voltage, wherein the at least one control unit is configured to select the MPP voltage as the operating voltage of the plurality of photovoltaic cells when the MPP voltage is greater than or equal to the limit voltage, wherein the at least one control unit is configured to select the limit voltage as the operating voltage of the plurality of photovoltaic cells when the MPP voltage is less than the limit voltage.

11. A method of controlling a solar power generation system comprising a plurality of photovoltaic cells, the method comprising:

determining an electrical parameter representative of an open circuit voltage of at least one photovoltaic cell of the plurality of photovoltaic cells, wherein the electrical parameter representative is based on voltage values and current values measured under a set of operating conditions, wherein the electrical parameter representative includes at least one of an IV curve or a PV curve based on the voltage values and the current values measured under the set of operating conditions;

calculating a limit voltage by multiplying the open circuit voltage by a predetermined ratio of a maximum power point (MPP) voltage to the open circuit voltage, wherein the open circuit voltage is a maximum voltage value of the voltage values measured when a current value of the current values measured is zero, wherein the MPP voltage is a point on at least one of the IV curve or the PV curve where the voltage values and the current values measured are maximized;

determining an operating voltage of the plurality of photovoltaic cells by performing maximum power point tracking (MPPT) of the plurality of photovoltaic cells, between the limit voltage and the open circuit voltage, wherein the at least one control unit is configured to select the MPP voltage as the operating voltage of the plurality of photovoltaic cells when the MPP voltage is greater than or equal to the limit voltage, wherein the at least one control unit is configured to select the limit voltage as the operating voltage of the plurality of photovoltaic cells when the MPP voltage is less than the limit voltage.

12. The method of claim 11, wherein performing the MPPT comprises a perturb and observe (P&O) method.

13. The method of claim 11, wherein the limit voltage is calculated to be in a range of 80% to 110% of the ratio of the predetermined MPP voltage to the open circuit voltage.

14. The method of claim 11, wherein the predetermined ratio of the MPP voltage to the open circuit voltage is in a range of 0.700-0.850.

15. The method of claim 14, wherein the limit voltage is calculated as circa 0.750-0.800 of the open circuit voltage.

16. The method of claim 11, wherein the MPPT is iterated over a plurality of iterations.

17. The method of claim 11, wherein the photovoltaic cells comprise tandem cells.

18. The method of claim 11, wherein the photovoltaic cells comprise crystalline silicon (CIGS), Perovskite or Cadmium telluride cells.

* * * * *